US010492132B2

(12) United States Patent
Lindoff et al.

(10) Patent No.: US 10,492,132 B2
(45) Date of Patent: Nov. 26, 2019

(54) COMMUNICATION DEVICE AND METHOD THEREIN FOR SELECTING CELL AND RADIO ACCESS TECHNOLOGY IN WIRELESS COMMUNICATION NETWORK (71) Applicant: Telefonaktiebolaget LM Ericsson (publ), Stockholm (SE)

(72) Inventors: Bengt Lindoff, Bjarred (SE); Magnus Astrom, Lund (SE); Joakim Axmon, Kavlinge (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 153 days.

(21) Appl. No.: 15/025,884

(22) PCT Filed: Feb. 8, 2016

(86) PCT No.: PCT/EP2016/052598
§ 371 (c)(1),
(2) Date: Mar. 29, 2016

(87) PCT Pub. No.: WO2017/137058
PCT Pub. Date: Aug. 17, 2017

(65) Prior Publication Data
US 2018/0041953 A1 Feb. 8, 2018

(51) Int. Cl.
*H04W 48/20* (2009.01)
*H04W 48/18* (2009.01)
(Continued)

(52) U.S. Cl.
CPC ........... *H04W 48/18* (2013.01); *H04W 24/08* (2013.01); *H04W 48/20* (2013.01); *H04W 88/06* (2013.01)

(58) Field of Classification Search
CPC .................................................... H04W 48/18
See application file for complete search history.

(56) References Cited

U.S. PATENT DOCUMENTS 8,718,685 B2 * 5/2014 Mehio ................... H04W 8/183
455/458
2003/0125073 A1 7/2003 Tsai et al.
(Continued)

FOREIGN PATENT DOCUMENTS

CN 103582051 A 2/2014
EP 2466970 A1 6/2012
(Continued)

OTHER PUBLICATIONS

PCT International Search Report, dated Jul. 13, 2016, in connection with International Application No. PCT/EP2016/052598, all pages.
(Continued)

*Primary Examiner* — Gary Lafontant
(74) *Attorney, Agent, or Firm* — Leffler Intellectual Property Law, PLLC (57) ABSTRACT A wireless communication device and method therein for selecting cell and Radio Access Technology, RAT, in a wireless communication system are disclosed. The wireless communication device comprises multiple receiving modules and at least two Subscriber Identity Modules, SIMs. The wireless communication device determines a first cell and a first RAT to camp on using a first receiving module for a first SIM based on estimating a performance of a number of RATs and cells in the wireless communication system. The wireless communication device determines a second cell and a second RAT to camp on using a second receiving module for a second SIM based on estimating a performance of the number of RATs and cells in the wireless communication system. The wireless communication device determines whether idle mode tasks of the first and second SIMs with the determined cells and RATs overlap in time. When the idle mode tasks of the first and second SIMs do not overlap in time, the wireless communication device handles the idle mode tasks of the first and second SIMs using the first (Continued)

receiving module or the second receiving module. When the idle mode tasks of the first and second SIMs overlap at least partly in time, the wireless communication device selects a SIM out of the first and second SIMs for which to move the idle mode tasks to a third receiving module and enabling the third receiving module to handle the idle mode tasks of the selected SIM.

20 Claims, 3 Drawing Sheets

(51) Int. Cl.
*H04W 24/08* (2009.01)
*H04W 88/06* (2009.01)

(56) References Cited

U.S. PATENT DOCUMENTS

| | | |
|---|---|---|
| 2011/0269456 A1 | 11/2011 | Krishnaswamy et al. |
| 2012/0264425 A1 | 10/2012 | Krishnamoorthy et al. |
| 2013/0077503 A1 | 3/2013 | Chaudhuri et al. |
| 2013/0090137 A1 | 4/2013 | Krishnamoorthy et al. |
| 2013/0150036 A1 | 6/2013 | Pattaswamy et al. |
| 2013/0150105 A1 | 6/2013 | Clevorn et al. |
| 2013/0303240 A1 | 11/2013 | Sanka et al. |
| 2013/0329639 A1 | 12/2013 | Wietfeldt et al. |
| 2014/0036710 A1 | 2/2014 | Chin et al. |
| 2014/0106750 A1 | 4/2014 | Roullier et al. |
| 2014/0128082 A1 | 5/2014 | Chirayil |
| 2014/0140287 A1 | 5/2014 | Cheng |
| 2014/0162635 A1 | 6/2014 | Cui et al. |
| 2014/0228039 A1 | 8/2014 | Zhao et al. |
| 2014/0295831 A1* | 10/2014 | Karra .................. H04W 68/005 455/434 |
| 2014/0342776 A1 | 11/2014 | Viswanadham et al. |
| 2015/0023217 A1 | 1/2015 | Hu et al. |
| 2015/0057044 A1 | 2/2015 | Altman |
| 2015/0057046 A1 | 2/2015 | Challa et al. |
| 2015/0141012 A1 | 5/2015 | Ramkumar et al. |
| 2015/0141017 A1 | 5/2015 | Krishnamoorthy et al. |
| 2015/0163827 A1 | 6/2015 | Ekici |
| 2015/0381291 A1 | 12/2015 | Mahajan et al. |
| 2016/0219648 A1 | 7/2016 | Awoniyi-Oteri et al. |
| 2016/0227557 A1 | 8/2016 | Fanous et al. |
| 2016/0242091 A1 | 8/2016 | Krishnamoorthy et al. |
| 2016/0242181 A1 | 8/2016 | Ponukumati et al. |
| 2016/0269938 A1 | 9/2016 | Krishnamoorthy et al. |
| 2016/0366615 A1 | 12/2016 | Batchu et al. |
| 2017/0048855 A1 | 2/2017 | Garg et al. |

FOREIGN PATENT DOCUMENTS

| | | | |
|---|---|---|---|
| EP | 2605558 A1 | 6/2013 | |
| EP | 2613592 | 7/2013 | |
| KR | 1020140017331 A | 2/2014 | |
| WO | 2012055434 A1 | 5/2012 | |
| WO | 2013014000 A1 | 1/2013 | |
| WO | 2014113484 A1 | 7/2014 | |
| WO | 2015009511 A2 | 1/2015 | |
| WO | 2015073448 A1 | 5/2015 | |
| WO | WO 2015073448 A1 * | 5/2015 | ........ H04W 36/0066 |

OTHER PUBLICATIONS

PCT Written Opinion, dated Jul. 13, 2016, in connection with International Application No. PCT/EP2016/052598, all pages.
3GPP TS 36.304 V12.6.0 (Sep. 2015), 3rd Generation Partnership Project; Technical Specification Group Radio Access Network; Evolved Universal Terrestrial Radio Access (E-UTRA); User Equipment (UE) procedures in idle mode (Release 12), 38 pages.
3GPP TSG-RAN#54, Tdoc RP-111637, Berlin, Germany, Dec. 6-9, 2011, Dual-SIM Dual-Standby UEs and their impact on the RAN, 3 pages.
PCT International Search Report, dated Jul. 13, 2016, in connection with International Application No. PCT/EP2015/079724, all pages.
PCT Written Opinion, dated Jul. 13, 2016, in connection with International Application No. PCT/EP2015/079724, all pages.
Office Action dated Oct. 19, 2017 in connection with U.S. Appl. No. 15/025,873, 33 pages.
Non-Final Office Action dated Aug. 28, 2018 in connection with U.S. Appl. No. 15/025,873, 29 pages.
Advisory Action dated Jun. 28, 2018 in connection with U.S. Appl. No. 15/025,873, 15 pages.
Final Office Action dated Mar. 30, 2018 in connection with copending U.S. Appl. No. 15/025,873, 30 pages.
Korean Office Action, dated Jun. 10, 2019, in connection with Korean Application No. 10-2018-7022841, 6 pages.
English language translation Korean Office Action, dated Jun. 10, 2019, in connection with Korean Application No. 10-2018-7022841, 6 pages.
Final Office Action dated Apr. 1, 2019 in connection with U.S. Appl. No. 15/025,873, 24 pages.
Japanese Office Action dated Jul. 16, 2019, in connection with Japanese Application No. 2018-537830, 3 pages.
English language summary of Japanese Office Action dated Jul. 16, 2019, in connection with Japanese Application No. 2018-537830, 2 pages.

\* cited by examiner

COMMUNICATION DEVICE AND METHOD THEREIN FOR SELECTING CELL AND RADIO ACCESS TECHNOLOGY IN WIRELESS COMMUNICATION NETWORK

TECHNICAL FIELD

Embodiments herein relate to a wireless communication device and a method therein. In particular, they relate to cell and Radio Access Technology (RAT) selection in the wireless communication device which comprises multiple receiving modules and at least two Subscriber Identity Modules, SIMs, operating in idle mode.

BACKGROUND

Wireless communication devices may be referred to as mobile telephones, user equipments (UE), wireless terminals, mobile terminals, mobile stations, cellular telephones, smart phones, laptops, tablets and phablets, i.e. a combination of a smartphone and a tablet with wireless capability. Wireless communication devices are enabled to communicate or operate wirelessly in a wireless communication system comprising multiple networks or Heterogeneous Networks (HetNet) with access nodes or access points. The heterogeneous networks may comprise, e.g. a cellular communications network comprising Second/Third Generation (2G/3G) network, such as Global System for Mobile Communications (GSM), Wideband Code Division Multiple Access (WCDMA) or High Speed Packet Access (HSPA) etc., 3G Long Term Evolution (LTE) network, Worldwide interoperability for Microwave Access (WiMAX) network, Wireless Local Area Network (WLAN) or WiFi etc. for proving different type of radio access technologies (RATs). A wireless communications network may cover a geographical area which is divided into cells or cover areas, wherein each cell is served by a network node, which may also be referred to as a serving network node, an access node, an access point or a base station, e.g. eNodeB or NodeB.

The development of new generations of cellular systems simultaneously with upgrading existing generations allows for a wider range of accessible networks and RATs. Previously the preference of what system or network to use, given a choice, has most often been the latest one. At present that is often LTE. For operators it may be a benefit of being able to shift traffic from heavily loaded, possibly also less efficient, older networks to newer, less loaded and more capable new networks. However, as most of wireless communication devices are equipped with the most recent generation of system, steering all LTE capable wireless communication devices to an LTE network may not be the preferred method in order to optimize the total network performance.

In an environment where a wireless communication device has access to multiple networks with different RATs, the prior art method gives the wireless communication device an influence of a network selection by using a setting stating a preferred RAT, e.g., LTE (preferred)/WCDMA (HSPA)/GSM. Hence, as long as signals from the LTE network may be received, the wireless communication device will use that instead of one of the other networks, e.g., HSPA. In an environment where e.g., both LTE and HSPA co-exist, data rates for the two RATs are comparable. Furthermore, both LTE and HSPA allow for multi carrier signalling. In LTE this capability is denoted as Carrier Aggregation (CA), allowing for up to five LTE carriers to be aggregated, whereas in HSPA it is denoted as Multi Carrier (MC), allowing for up to eight HSPA carriers to be aggregated.

Another arising scenario today is multiple Subscriber Identity Modules (SIMs) devices which may carry two or more SIMs from a single or multiple operators in the same device. Particularly in Asia this has become de facto standard, although it has not been standardized by the 3rd Generation Partnership Project (3GPP). On many markets it is hard to get operator approval and volumes for a mid-end device without the capability of supporting at minimum Dual SIM Dual Standby (DSDS). The capability of supporting DSDS allows a UE to be camping on two cells simultaneously, or being connected to one cell and camping on the other. In case both SIMs are from the same operator, the UE may occasionally camp on the same cell but with two different identities and associated paging occasions. In order to qualify for high-end device approval, it is generally required to support Dual SIM Dual Activity (DSDA), whereby the UE can be independently connected towards two cells simultaneously.

The popularity of DSDS/DSDA devices on Asian markets depends on several factors. One factor may be that operators have different price plans e.g. for data and voice, or may have different price plans depending on calling subscribers in same or other network. Other factors may be, e.g. different coverage by different operators, i.e. spotty coverage, or that one cannot move a mobile phone number between operators. The trend is towards to support even more than two SIMs simultaneously, and devices with support for three and four SIMs, Triple SIM, Triple Standby (TSTS) and Quad SIM Quad Standby (QSQS) have been announced by some UE vendors.

For DSDA devices in active mode, it is required for the UE to use separate receivers for each connection, since it e.g. may use a Packet Switched (PS) service simultaneously for both SIMs, or may use PS service for one and a Circuit Switched (CS) service for the other. Therefore to support DSDS/DSDA, TSTS/QSQS and different RATs, the wireless communication devices usually comprise multiple receiving modules.

For improving the performance of wireless communication devices with multiple SIMs and multiple receiving modules, it is desirable to select a cell and RAT to camp on for respective SIMs when it is in idle operating mode and optimize the selection of cells and RATs for all SIMs.

In EP2613592, a method for single SIM UEs to obtain the best suitable RAT for use is disclosed. Parameters such as throughput and/or latency, bandwidth, Reference Signal Received Power (RSRP) or Reference Signal Received Quality (RSRQ) may be measured for each of the available RATs, and the RAT with the best value in respect of high performance is selected.

However applying the same or similar principles for RAT selections for all SIMs in a wireless communication device with multiple SIMs may run into some problems. As in idle mode, a single receiver is usually used, i.e. radio resource or receiving module is shared between SIMs, for power saving reasons, independent selection of the best RAT for respective SIM may cause trouble in radio resource management of the wireless communication device during the idle mode procedures for respective connections.

In EP2605558, a method for RAT selection for a dual SIMs UE in idle mode for power optimization is disclosed. For example, for reducing power consumption, a first RAT may be employed that provides less bandwidth but uses less power to operate than a performance-centered second RAT.

If both SIMs are idle, it may search for and discover RATs by indicia of the RATs such as RAT type (2G/3G/4G), signal strength, cell identifiers, or other indicia. As Radio Frequency (RF) interface or resource may be shared between the two SIMs when in idle mode, it may monitor for incoming calls for either SIM in accordance with a first RAT. During connected mode, the first RAT used in idle mode for the first SIM may be switched to the second RAT. One limitation of this method is that the first and second SIMs are forced to use the same RAT when both are in idle mode. The coverage provided by the selected RAT may be unfavorable for one of the first or second SIM when those are from different operators.

In WO2012055434, a method to operate a UE with multiple SIMs and Multiple Input/Multiple Output (MIMO) capability which comprises a plurality of radio branches in different operating mode is disclosed. In the first operating mode two or more radio branches are used to exchange information with a single network using single SIM. In the second operating mode the different radio branches are used to exchange information with different telecommunications networks using different SIMs. The first and second operating modes may be switched between depending on different requirements, such as data rate, reception quality or receiving and transmitting simultaneously in different networks. The method focus on connected mode and enable the user equipment to be flexibly used in dependence on the needs of the user and different reception situations. However, the cells and RATs to camp on for respective SIMs in idle mode may be unfavorable. Therefore the cell and RATs used for respective SIMs for the different operating modes may be non-optimal and once doing connection set up a handover may be needed which may increase signaling and risk of introducing interruption in connection, thereby quality of service may be lower.

SUMMARY

It is therefore an object of embodiments herein to provide an improved RAT and cell selection and radio resource management for a wireless communication device with multiple SIMs and multiple receiving modules in a wireless communication system.

According to a first aspect of embodiments herein, the object is achieved by a method performed in a wireless communication device for selecting cell and Radio Access Technology, RAT, in a wireless communication system. The wireless communication device comprises multiple receiving modules and at least two Subscriber Identity Modules, SIMs. The wireless communication device determines a first cell and a first RAT to camp on using a first receiving module for a first SIM based on estimating a performance of a number of RATs and cells in the wireless communication system. The wireless communication device determines a second cell and a second RAT to camp on using a second receiving module for a second SIM based on estimating a performance of the number of RATs and cells in the wireless communication system. The wireless communication device determines whether idle mode tasks of the first and second SIMs with the determined cells and RATs overlap in time. When the idle mode tasks of the first and second SIMs do not overlap in time, the wireless communication device handles the idle mode tasks of the first and second SIMs using the first receiving module or the second receiving module. When the idle mode tasks of the first and second SIMs overlap at least partly in time, the wireless communication device selects a SIM out of the first and second SIMs for which to move the idle mode tasks to a third receiving module. The wireless communication device then enables the third receiving module to handle the idle mode tasks of the selected SIM.

According to a second aspect of embodiments herein, the object is achieved by a wireless communication device for selecting cell and Radio Access Technology, RAT, in a wireless communication system. The wireless communication device comprises multiple receiving modules and at least two Subscriber Identity Modules, SIMs. The wireless communication device is configured to determine a first cell and a first RAT to camp on using a first receiving module for a first SIM based on estimating a performance of a number of RATs and cells in the wireless communication system. The wireless communication device is further configured to determine a second cell and a second RAT to camp on using a second receiving module for a second SIM based on estimating a performance of the number of RATs and cells in the wireless communication system. The wireless communication device is configured to determine whether idle mode tasks of the first and second SIMs with the determined cells and RATs overlap in time. When the idle mode tasks of the first and second SIMs do not overlap in time, the wireless communication device is configured to handle the idle mode tasks of the first and second SIMs using the first receiving module or the second receiving module. When the idle mode tasks of the first and second SIMs overlap at least partly in time, the wireless communication device is configured to select a SIM out of the first and second SIMs for which to move the idle mode tasks to a third receiving module and enable the third receiving module to handle the idle mode tasks of the selected SIM.

According to the embodiments herein, the cells and RATs are determined for respective SIMs based on estimating the performance of a number of RATs and cells in the wireless communication system. The performance of a number of RATs and cells may be estimated based on throughput, latency or power consumption, therefore the determined cells and RATs have the best performance and are the best cell and RAT for respective SIMs.

After the best cells and RATs are determined for respective SIMs, the idle mode tasks of the first and second SIMs are checked whether they overlap in time. If this is the case, one of the SIM needs to use a different receiving module to handle the idle mode tasks. If the idle mode tasks of the first and second SIMs do not overlap in time, the idle mode tasks for the first and second SIMs are handled using the same receiving module. In this way, an adaptation of at least one of the SIMs to move the idle mode tasks to another receiving module may be made so that radio resource management in the wireless communication device may be optimized to save power. Further, by determining which SIM needs to move the idle mode tasks, the selection of SIM may be based for instance on SIM prioritizations, throughput or latency of the selected cell and RATs for respective SIMs. Moreover the performance of multiple receiving modules, e.g. power consumption, receiver linearity, sensitivity, bandwidth etc., may also be taken into account with regard to the idle mode tasks. For example, the receiving module with lower performance but lower power consumption may be used for handling the idle mode tasks of the SIM with lower priority or handling the idle mode tasks of the SIM with less demanding throughput or latency requirements. Thus the overall performance of the wireless communication device may be improved.

In conclusion, by determining the cells and RATs based on performance of the RATs, the best possible cells and RATs to camp on for respective SIMs may be selected. Further by further adapting enabling the receiving module for the selected SIM based on the idle mode tasks, multiple receiving functionality for performing the idle mode tasks is only enabled when really needed to minimize the idle mode power consumption. Therefore, the embodiments herein provide an improved method for optimized selection of RATs and cells for all supported SIMs and at the same time provide an optimized management of radio resources during idle mode in the wireless communication device.

BRIEF DESCRIPTION OF THE DRAWINGS

Examples of embodiments herein are described in more detail with reference to attached drawings in which.

DETAILED DESCRIPTION

Figure 1:
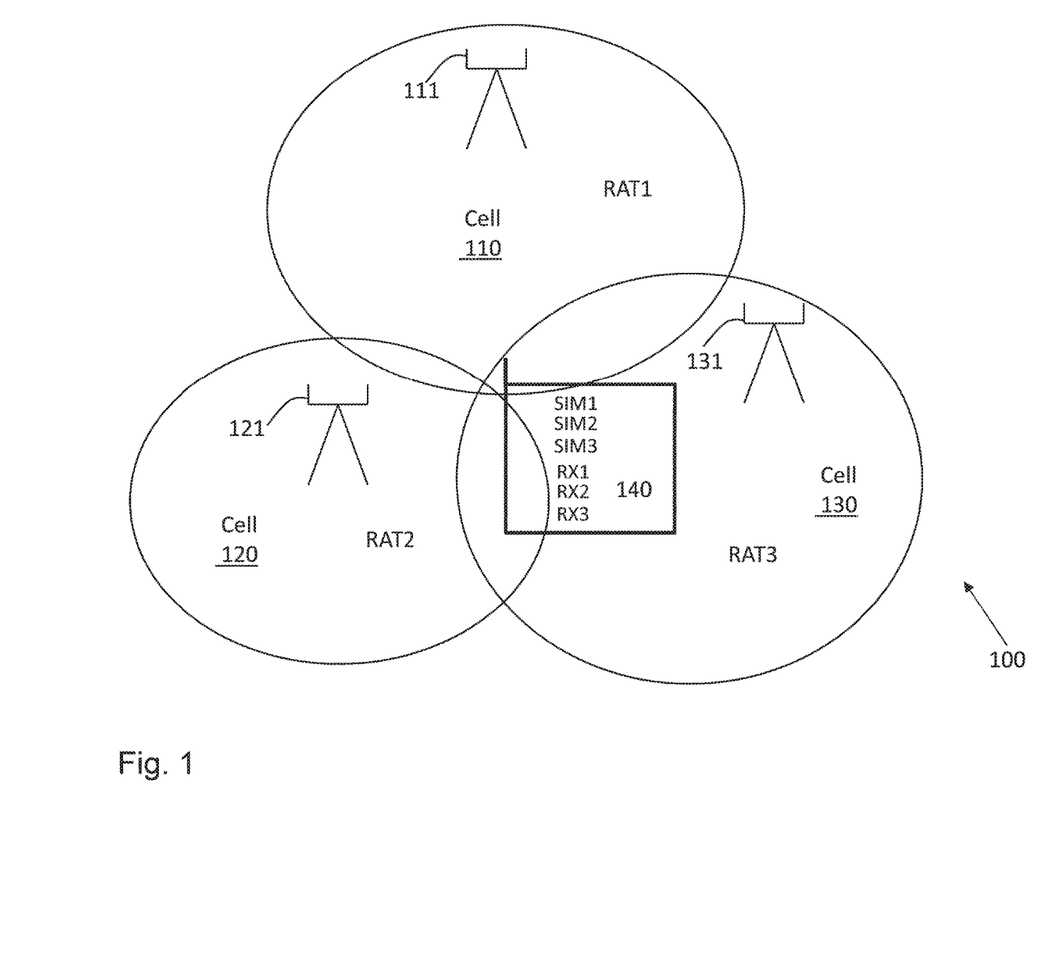
FIG. 1 is a schematic block diagram illustrating embodiments of a wireless communication system.

FIG. 1 depicts an example of a wireless communication system 100 in which embodiments herein may be implemented. The wireless communication system 100 may comprise one or more wireless communication networks such as e.g. any 2G, 3G, 4G or LTE networks, Wimax, WLAN or WiFi, Bluetooth etc. for providing different RATs.

Each wireless communication network may cover a geographical area which is divided into cells or cover areas. Each cell area is served by a network node operating in the respective wireless communication network. In FIG. 1, three network nodes are shown, network node 111, network node 121, and network node 131. The term network node as used herein may also referred to as a serving network node, an access node, an access point or a base station. Therefore the wireless communication system 100 may comprise a number of network nodes serving cells with RATs which may be different, and support communications for a number of wireless communication devices located therein. The network node 111 serves a cell 110 and provides a first RAT, RAT1, the network node 121 serves a cell 120 and provides a second RAT, RAT2, and the network node 131 serves a cell 130 and provides a third RAT, RAT3. The RATs, RAT1, RAT2 and RAT3 may be same or different RATs, e.g. LTE, WCDMA, GSM or Enhanced Data GSM Evolution (EDGE) etc.

A number of wireless communication devices operate in the wireless communication system 100, whereof one, a wireless communication device 140, is shown in FIG. 1.

The wireless communication device 140 may be, e.g. a mobile terminal or station, a wireless terminal, a user equipment, a mobile phone, a computer such as e.g. a laptop, a Personal Digital Assistants (PDAs) or a tablet computer etc. The wireless communication device 140 comprises at least two SIMs, whereof the wireless communication device 140 shown in FIG. 1 comprises SIM1, SIM2, SIM3. The at least two SIMs may belong to different operators, e.g. which may provide different subscriptions, or provide different RATs or use different spectrum in different cover areas or cells, e.g. in cities or countryside. Further, the service subscriptions of the two or more SIMs may differ, such as one SIM may provide an all-exclusive service whereas the other may provide only fundamental past generation service.

The wireless communication device 140 comprises multiple radio receiving modules, whereof the wireless communication device 140 shown in FIG. 1 comprises three radio receiving modules RX1, RX2, RX3.

Example of embodiments of a method performed in the wireless communication device 140 for selecting cell and Radio Access Technology in the wireless communication system 100 will now be described with reference to FIG. 2. The wireless communication device 140 comprises multiple receiving modules RX1, RX2, RX3 and at least two Subscriber Identity Modules (SIMs), and is in an idle operating mode. The method comprises the following actions, which actions may be taken in any suitable order.

According to some embodiments, the wireless communication device 140 comprises a manager unit for the respective two or more SIMs, each of manage unit managing an idle mode procedure for the respective SIM, i.e. searching for and determining a best suitable cell and RAT to camp on etc. Accordingly, the wireless communication device 140 performs the following actions:

Action 201

The wireless communication device 140 determines a first cell and a first RAT to camp on for a first SIM using a first receiving module based on estimating performance of a number of RATs and cells in the wireless communication system 100.

Action 202

The wireless communication device 140 determines a second cell and a second RAT to camp on using a second receiving module for a second SIM based on estimating performance of the number of RATs and cells in the wireless communication system 100.

According to some embodiments, the first and second receiving modules are the same. Thus the wireless communication device 140 determines the cell and RATs for respective SIMs using the same receiving module and thereby power consumption may be reduced.

According to some embodiments, the performances of at least two different RATs may be estimated for the respective SIMs.

According to some embodiments, the performances of the number of RATs and cells may be estimated based on at least one of or a combination of throughput, latency, mobility and power consumption.

For example, the RAT giving the best expected throughput may be determined for respective SIMs.

There are several reasons and advantages to determine RAT and cell selection based on throughput. The first is that the multiple SIMs may not belong to the same operator, e.g. one may provide an LTE subscription and the other a HSPA subscription. The second is that an operator may provide different technologies or use different spectrum in cities compared to the countryside. The third is that the service subscriptions of the two or more SIMs may differ, such as one SIM may provide an all-exclusive service whereas the other may provide only fundamental past generation service. Therefore throughput is a more appropriate parameter than e.g., traditional signal to noise ratio, SNR, since it gives a better indicator of the possible services that may be provided in an heterogeneous environment with different RATs.

On the other hand, determining the cell and RAT selection based on latency also has some advantages in some embodiments. For example, RAT with lowest latency may be selected for respective SIMs. Therefore, for some applications, e.g. time or mission critical message communication, real-time, tactile services or user interfaces, such as remote displaying, where it is required that transmission should not exceed a certain latency in order for the user not to start noticing it, the latency for the transmission may be reduced and thereby improve the performance of the wireless communication device. Moreover, small Transmission Control Protocol (TCP) packets with significant Acknowledged/Not Acknowledged (ACK/NACK) signaling may suffer in a high latency network since the ACK/NACK round trip time will limit new packets from being transmitted and hence limit performance. Determining the cell and RAT selection based on latency a low latency network could be selected.

Since there are different service requirements and/or applications for the different SIMs, the wireless communication device 140 may determine the first cell and RAT to camp on for the first SIM based on estimating throughput and determine a second cell and a second RAT to camp on for a second SIM based on estimating latency, or vice versa.

According to some embodiments, the throughput or latency of at least two different RATs are estimated for the respective SIMs. Here the method for estimating throughput for three different RATs, e.g. LTE, HSPA, EDGE are described. However the method is not limited to these RATs.

In LTE, the expected throughput may be calculated e.g. by help of any one or more out of a Cell-Specific Reference Signal (CRS), a Channel State Information Reference Signal (CSI-RS) or Demodulation Reference Signal (DMRS) symbols, from which it is possible to estimate the Signal to Noise Ratio (SNR) and Mutual Information (MI), i.e., the amount of information that an LTE subcarrier is able to transmit over the present channel. Based on either a sub-band or wideband estimation of MI, it is possible to estimate the expected throughput of the LTE channel, by reading the bandwidth of the channel, which is part of the Master Information Blocks (MIB) in the Physical Broadcast Channel (PBCH), and multiplying the number of LTE subcarriers, derived from the bandwidth, with the MI for each subcarrier.

In the case both the network nodes 111, 121, 131 and the wireless communication device 140 are capable of Multiple Input Multiple Output (MIMO) transmissions using a spatial diversity MIMO channel, the MIs of the individual layers are accumulated, in order to take full advantage of the MIMO functionality that LTE offers. Therefore according to some embodiments, MIMO capabilities of the network nodes 111, 121, 131 in the cells 110, 120, 130 and/or the wireless communication device 140 are taken into account when estimating throughput.

In HSPA, a similar procedure is followed by using the Common Pilot Channel (CPICH) from which it is possible to estimate both SNR and MI. Having obtained these, the expected throughput may be computed. Also here, any MIMO capability of the network node 111, 121, 131 and the wireless communication device 140 is included when estimating throughput.

In EDGE the expected maximum throughput may be determined by reading System Information Blocks (SIBs). There are 13 SIBs, SIB1 to SIB13, defined in the $3^{rd}$ Generation Partnership Project (3 GPP) standards characterized by the type of information that they include. From reading SIB13 the multi slot class supported by the base station and highest modulation order may be acquired. The maximum throughput can then be scaled by Signal-to-Noise-and-Interference Ratio (SINR) or Received Signal Strength Indicator (RSSI) to form an estimate of the expected throughput.

Having scanned the spectrum over all frequency bands for which the wireless communication device 140 is designed and for which the scan is to take place, and for each band having identified the operating RAT, e.g. LTE, WCDMA or GSM, for said band, the wireless communication device 140 use the results of the scanning for calculating the expected throughput of the best candidates, and selects the candidate that is most likely to provide the highest throughput.

According to some embodiments herein, the determination of the cell and RAT for respective SIMs may also be based on the latency of a number of RATs and cells in the wireless communication system 100.

The latency of a cell and RAT may be obtained from the latency information stored in the wireless communication device 140 measured or estimated earlier in a measurement or application procedure. The wireless communication device 140 may measure the latency of a cell and RAT by measuring a round trip time, i.e. a transmission time between the network node with a particular RAT and the wireless communication device 140, via sending a ping signal to the network node 111, 121, 131. The communication device 140 may compare the round trip time for different RATs and choose the cell and RAT with a shorter round trip time, i.e. lower latency.

According to some embodiments herein, channel bandwidth is taken into account when estimating throughput or latency based on information of MIMO, Carrier Aggregation (CA), Dual Connectivity (DC), MA capabilities, or multi carrier capabilities of network nodes serving the cells and/or the wireless communication device 140. For example, when both the network node 111, 121, 131 and the wireless communication device 140 are capable of CA, DC or MC, respectively, the expected throughput may be modified in order to also include any gain coming from CA, DC or MC. Since the information regarding CA, DC or MC is not signaled unless a data channel is actually being set up, this information may normally not be available unless the wireless communication device 140 keeps a record of it itself.

A higher modulation order and code rate increases throughput by allowing more bits to be transmitted by each modulation symbol and by reducing the number of redundancy bits introduced in the coding, respectively. With more information bits transmitted in each physical resource, throughput can be increased significantly. For example, 256QAM modulation provides high modulation order than other modulations. Therefore according to some embodiments, the modulation and coding capability may be taken into account when estimating throughput or latency.

According to some embodiments herein, carrier frequency may be taken into account due to mobility when estimating throughput or latency. A lower carrier frequency is preferable in a mobile environment since this implies a longer cell range, fewer handovers, and thus higher reliability and fewer interrupts, which in turn implies lower latency.

According to some embodiments herein, the network load of the cells are taken into account when estimating throughput and latency. For example, the wireless communication device 140 may obtain information about the network load and this information may be included when estimating the expected throughput of the network. Since the wireless communication device 140 is less likely to obtain all network resources in a more heavily loaded network, the expected throughput may be compensated by the load, e.g. by scaling, $$\widetilde{E[\psi]} = (1-\rho)E[\psi]$$

in which $E[\psi]$ is the uncompensated expected throughput, $\rho$ is the load factor ($0<\rho<1$), and $\widetilde{E[\psi]}$ is the compensated throughput.

According to some embodiments, the wireless communication device 140 may determine RAT and cell selection based on power consumption. For example, different receiving modules may have different power consumption or performance for different RATs etc. The power consumption for some or all combinations of cells and RATs and receiving modules may be compared in order to identify the cell and RAT and receiving module combination with the lowest power consumption.

The determination of the cell and RAT for respective SIMs may be done in for instance during initial cell search. Hence first, e.g. for SIM1, a best camping cell and RAT is determined. The information on the best camping cell and RAT, and other information including, e.g. timing information for paging, signal strength measurements etc., which are defined according to the standard of the determined RAT may be stored in a memory of the wireless communication device 140. Then the same procedure is performed for SIM2, SIM3 and so on.

In idle mode, the wireless communication device 140 will for example, monitor paging and carry out mobility management. For power saving reasons, the RF unit, e.g. the radio receiver or radio receiving modules within the wireless communication device 140 needs to be shared between the two or more different SIMs in idle mode. For example, in case both SIMs are in idle mode it may be attractive to use only one of the receiving module in a time-division manner to maintain connectivity towards the first network and to monitor paging for the second network. Therefore, after the best cell and RAT is determined for all SIMs, the wireless communication device 140 needs to check if idle mode tasks of the first and second SIMs in the first and second cells have conflicting needs in using the radio receiving module. Accordingly, the following action will be performed in the wireless communication device 140.

Action 203

The wireless communication device 140 determines whether idle mode tasks of the first and second SIMs with the determined cells and RATs overlap in time.

According to some embodiments herein, the idle mode tasks may comprise at least one of a synchronization procedure, a paging reception, a periodic monitoring of downlink assignments, signal strength measurements or reception of broadcast and multicast data, e.g. receiving Multicast-Broadcast Single-Frequency Network (MBSFN) channel in LTE.

According to some embodiments, the wireless communication device 140 may determine, based on the paging and/or measurement timing on determined camping cell and RAT for respective SIMs, if the time period for needing the radio receiving module, e.g. to receive paging signals, send measurement results etc., is at least partly overlapping.

If the idle mode tasks do not overlap in time, the following action will be performed in the wireless communication device 140.

Action 204

The wireless communication device 140 handles the idle mode tasks of the first and second SIMs using the first receiving module or the second receiving module. That means the wireless communication device 140 handles the idle mode tasks of the first and second SIMs using the same receiving module in a time-division manner to minimize power consumption. Which one of the first or second receiving module being used may depend on their performance, e.g. power consumption, linearity, sensitivity, bandwidth etc. If the idle mode tasks of the first and second SIMs have lower requirements on linearity, sensitivity or bandwidth, the receiving module with lower performance but lower power consumption may be used.

If the idle mode tasks overlap at least partly in time, one of the SIMs needs to use a different receiving module to handle the idle mode tasks. Accordingly, the following actions will be performed in the wireless communication device 140.

Action 205

The wireless communication device 140 selects a SIM for which to move idle mode tasks to a third receiving module.

Action 206

The wireless communication device 140 enables the third receiving module to handle the idle mode tasks of the selected SIM.

According to some embodiments, the third receiving module may be the same as the first receiving module or the second receiving module. That means, if the selected SIM is the second SIM and the wireless communication device 140 handles the idle mode tasks of the first SIM using the first receiving module, then the idle mode tasks of the second SIM is moved to the second receiving module, i.e. the third receiving module is the same as the second receiving module. If the selected SIM is the first SIM and the wireless communication device 140 handles the idle mode tasks of the second SIM using the second receiving module, then the idle mode tasks of the first SIM is moved to the first receiving module, i.e. the third receiving module is the same as the first receiving module. If there are more than three SIMs and both the first and second receiving modules are used, then the third receiving module is enabled to handle the idle tasks of the selected SIM.

Therefore, in case of partly overlapping needs for the same radio resources or receiving modules, the wireless communication device 140 determines which SIM needs to move its idle mode tasks to another receiving module. In this way, an adaptation of at least one of the SIM to move the idle mode tasks to another receiving module may be made so that radio resource management in the wireless communication device may be optimized to save power.

According to some embodiments herein, the wireless communication device 140 may select a SIM for which to move its idle mode tasks based on comparing priority of the SIMs. The SIM with lower priority may be selected to move its idle mode tasks. That means, the adaptation is made based on SIM priority, which may be pre-defined by user or based on which of the SIMs having a higher QoS requirement. The SIM with the highest priority may be allocated to the primary receiving module, e.g. the first receiving module RX1, which is preferred with regard to the performance, e.g. bandwidth, sensitivity etc. but with higher power consumption. The SIM with a lower QoS requirement may have lower priority and may be allocated to a secondary receiving module, e.g. the second receiving module RX2, to handle its idle mode tasks. The secondary receiving module may have lower performance compared with the primary receiving module but with lower power consumption.

According to some embodiments herein, the wireless communication device 140 may select a SIM for which to move its idle mode tasks based on comparing the throughput or latency of the respective determined cell and RAT for the respective SIMs. The SIM with lower throughput or higher latency of the determined cell and RAT may be selected to move its idle mode tasks to a second or a third receiving module.

According to some embodiments herein, the wireless communication device 140 may determine the SIM which needs to move its idle mode tasks based on a minimized total power consumption. For example, different receiving module may have different power consumption or performance for different RATs etc. Power consumptions for the idle mode tasks of all SIMs with their respective determined cells and RATs may be compared and a SIM may be selected and its idle mode tasks may be handled by certain receiving module such that the total power consumption is minimized.

To summarize, by determining the cells and RATs based on throughput, latency or power consumption, the best possible cells and RATs to camp on for respective SIMs may be selected. Further, by adapting at least one SIM to a receiving module based on the idle mode tasks, i.e. enabling the receiving module to handle the idle mode tasks for the selected SIM, multiple receiving functionality for performing the idle mode tasks is only enabled when really needed to minimize the idle mode power consumption. Thus, the embodiments herein provide an improved method for optimized selection of RATs and cells for all supported SIMs and optimized radio resource management during idle mode in the wireless communication device.

Figure 2:
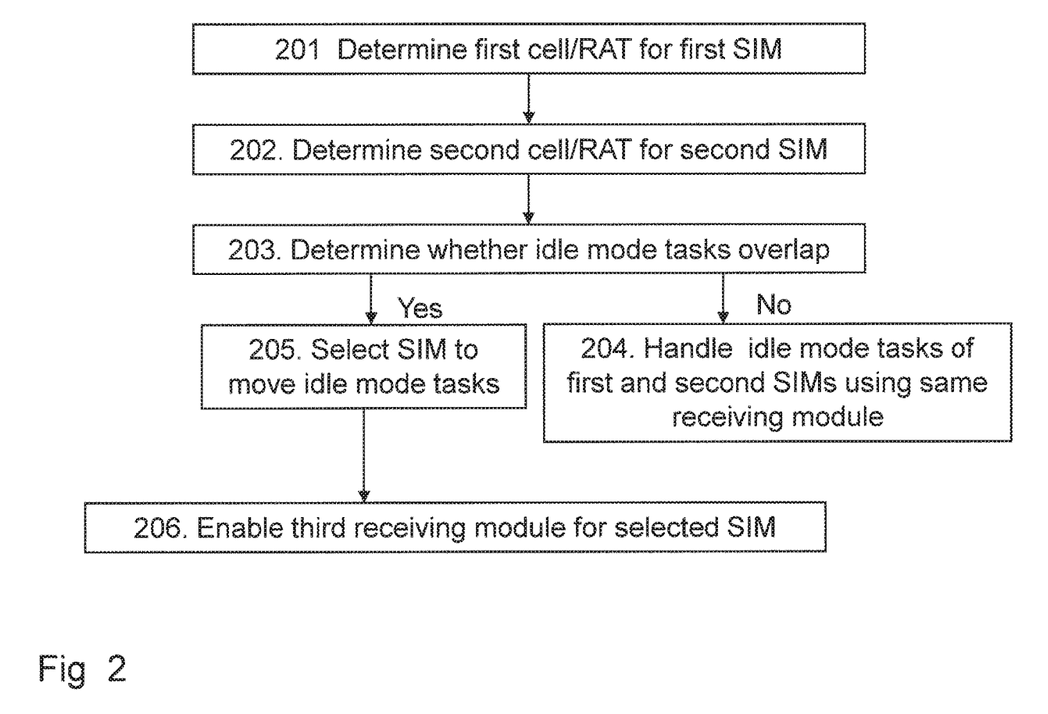
FIG. 2 is a flowchart illustrating embodiments of a method in a wireless communication device.
Figure 3:
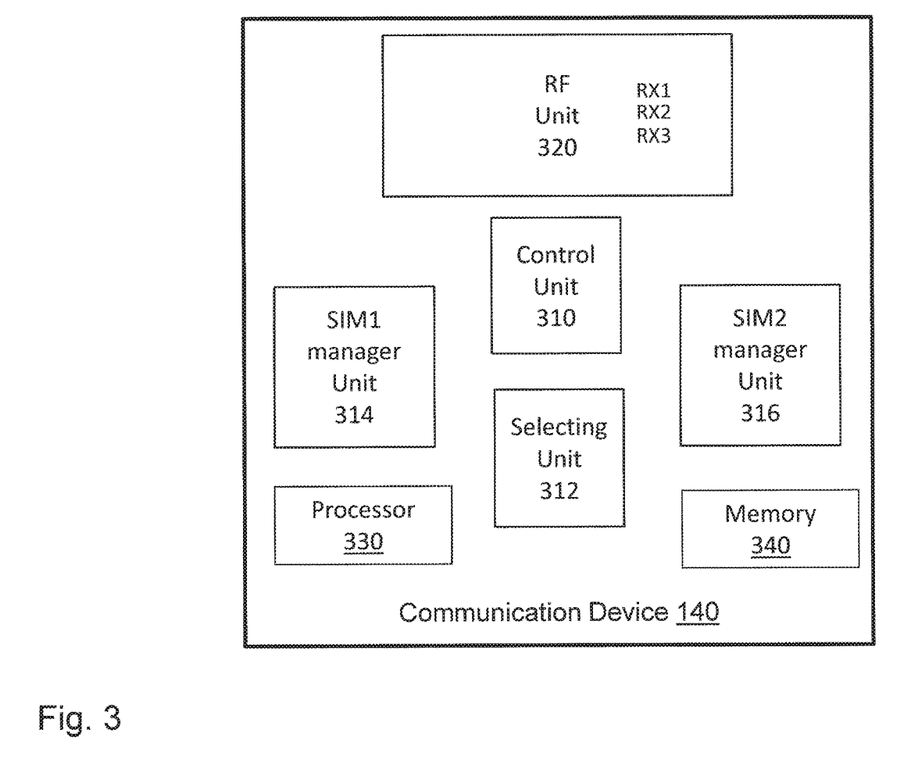
FIG. 3 is a schematic block diagram illustrating embodiments of a wireless communication device.

To perform the method actions in the wireless communication device 140 for selecting cell and Radio Access Technology described above in relation to FIG. 2, the wireless communication device 140 comprises the following circuits, units or modules depicted in FIG. 3. As mentioned above, the wireless communication system 100 comprises any one or more 2G, 3G, 4G or LTE networks, Wimax, WLAN or WiFi etc. The wireless communication device 140 may comprise, e.g. a control unit 310, a selecting unit 312, a RF unit 320, a SIM1 manager unit 314, a SIM2 manager unit 316, etc. The RF unit 320 may represent any radio resources or radio interfaces, e.g. radio receivers or transmitters etc. for receiving and transmitting radio signals from/to network nodes. The RF unit 320 comprises multiple receiving modules RX1, RX2, RX3 as shown in FIG. 3.

According to the embodiments herein, the communication device 140 is configured to, e.g. by means of the SIM1 manager unit 314 being configured to, determine a first cell and a first RAT to camp on for a first SIM using a first receiving module based on estimating performance of a number of RATs and cells in the wireless communication system 100.

The communication device 140 is further configured to, e.g. by means of the SIM2 manager unit 316 being configured to, determine a second cell and a second RAT to camp on for a second SIM using a second receiving module based on estimating performance of a number of RATs and cells in the wireless communication system 100.

The communication device 140 is further configured to, e.g. by means of the control unit 310 being configured to, determine whether idle mode tasks of the first and second SIMs with the determined first and second cells and RATs overlap in time.

If the idle mode tasks do not overlap in time, the wireless communication device 140 is configured to handle the idle mode tasks of the first and second SIMs using the first receiving module or the second receiving module.

When the idle mode tasks of the first and second SIMs with the determined cells and RATs overlap at least partly in time, the communication device 140 is further configured to e.g. by means of a selecting unit 312 being configured to, select a SIM out of the first and second SIMs for which to move the idle mode tasks to a third receiving module, and configured to e.g. by means of the control unit 310, enable the third receiving module to handle the idle mode tasks of the selected SIM.

According to some embodiments herein, the first receiving module and the second receiving module may be the same.

According to some embodiments herein, the third receiving module may be the same as the first receiving module or the second receiving module.

According to some embodiments herein, channel bandwidth may be taken into account when estimating throughput or latency based on information of Multiple Input Multiple Output, MIMO, carrier aggregation, dual connectivity, modulation and coding or multi carrier capabilities of network nodes in the cells and/or the wireless communication device.

According to some embodiments herein, carrier frequency may be taken into account due to mobility when estimating throughput or latency.

According to some embodiments herein, network loads of the cells may be taken into account when estimating throughput or latency.

According to some embodiments herein, the idle mode tasks may comprise at least one of a synchronization procedure, a paging reception, a periodic monitoring of downlink assignments, signal strength measurements or reception of broadcast and multicast data.

According to some embodiments herein, the wireless communication device 140 may be configured, e.g. by means of the selecting unit 312 being configured to, select a SIM out of the first and second SIMs for which to move the idle mode tasks to a third receiving module based on comparing priority of the SIMs, the SIM with lower priority may be selected to move the idle mode tasks to a third receiving module.

According to some embodiments herein, the wireless communication device 140 may be configured to select a SIM out of the first and second SIMs for which to move the idle mode tasks to a third receiving module based on comparing the throughput or latency of the respective determined cell and RAT for the respective SIMs, the SIM with lower throughput or higher latency of the determined cell and RAT may be selected to move the idle mode tasks to a third receiving module.

According to some embodiments herein, the wireless communication device 140 may be configured to select a SIM out of the first and second SIMs for which to move the idle mode tasks to a third receiving module based on a minimized total power consumption.

According to some embodiments herein, the performance of at least two different RATs may be estimated for the respective SIMs.

According to some embodiments herein, the performance of the number of RATs and cells may be estimated based on at least one of or a combination of throughput, latency, mobility and power consumption Those skilled in the art will appreciate that the control unit 310, the selecting unit 312, the SIM1 manager unit 314 and SIM2 manager unit 316 described above may be referred to one unit, a combination of analog and digital circuits, one or more processors, such as processor 330, depicted in FIG. 3, configured with software and/or firmware and/or any other digital hardware performing the function of each unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip (SoC).

The wireless communication device 140 may further comprise a memory 340 comprising one or more memory units. The memory 340 is arranged to be used to store information, e.g. lists of cells, throughput and latency measurements and data, as well as configurations to perform the methods herein when being executed in the communication device 140.

The embodiments herein in the wireless communication device 140 for cell and RAT selection in the wireless communication system 100, may be implemented through one or more processors, such as the processor 330 in the wireless communication device 140 together with computer program code for performing the functions and actions of the embodiments herein. The program code mentioned above may also be provided as a computer program product, for instance in the form of a data carrier carrying computer program code for performing the embodiments herein when being loaded into the wireless communication device 140. One such carrier may be in the form of a CD ROM disc. It is however feasible with other data carriers such as a memory stick. The computer program code may furthermore be provided as pure program code on a server and downloaded to the wireless communication device 140.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed in a wireless communication device for selecting cell and Radio Access Technology (RAT) in an idle operating mode in a wireless communication system, wherein the wireless communication device comprises multiple receiving modules and comprises at least two Subscriber Identity Modules (SIMs) the method comprising:
   determining a first cell and a first RAT to camp on for a first SIM based on estimating a performance of a number of RATs and cells in the wireless communication system;
   determining a second cell and a second RAT to camp on for a second SIM based on estimating a performance of the number of RATs and cells in the wireless communication system;
   determining whether idle mode tasks of the first and second SIMs with the determined cells and RATs overlap at least partly in time;
   when the idle mode tasks of the first and second SIMs do not overlap in time,
      handling the idle mode tasks of the first and second SIMs using a same one of the multiple receiving modules;
   when the idle mode tasks of the first and second SIMs overlap at least partly in time,
      enabling one of the receiving modules to handle the idle mode tasks of one of the first and second SIMs and enabling a different one of the receiving modules to handle the idle mode tasks of a different one of the first and second SIMs.

2. The method according to claim 1, wherein the performance of at least two different RATs are estimated for the respective SIMs.

3. The method according to claim 1, wherein the performance of the number of RATs and cells are estimated based on at least one of or a combination of throughput, latency, mobility and power consumption.

4. The method according to claim 3, wherein channel bandwidth is taken into account when estimating throughput or latency based on information of Multiple Input Multiple Output (MIMO) carrier aggregation, dual connectivity, modulation and coding or multi carrier capabilities of network nodes in the cells and/or the wireless communication device.

5. The method according to claim 3, wherein carrier frequency is taken into account due to mobility when estimating throughput or latency.

6. The method according to claim 3, wherein network loads of the cells are taken into account when estimating throughput or latency.

7. The method according to claim 1, wherein the idle mode tasks comprises at least one of a synchronization procedure, a paging reception, a periodic monitoring of downlink assignments, signal strength measurements or reception of broadcast and multicast data.

8. The method according to claim 1, comprising:
   when the idle mode tasks of the first and second SIMs overlap at least partly in time, assigning a preferred one of the receiving modules to handle the idle mode tasks of a highest priority one of the first and second SIMs and assigning a different one of the receiving modules to handle the idle mode tasks of a different one of the first and second SIMs.

9. The method according to claim 1, comprising:
   when the idle mode tasks of the first and second SIMs overlap at least partly in time, assigning a preferred one of the receiving modules to handle the idle mode tasks of a higher throughput or a lower latency one of the first and second SIMs and assigning a different one of the receiving modules to handle the idle mode tasks of a different one of the first and second SIMs.

10. The method according to claim 1, comprising:
    when the idle mode tasks of the first and second SIMs overlap at least partly in time, deciding which of the receiving modules will handle the idle mode tasks of the first SIM and which other one of the receiving modules will handle the idle mode tasks of the second SIM based on a minimized total power consumption.

11. A wireless communication device for selecting cell and Radio Access Technology (RAT) in an idle operating mode in a wireless communication system, wherein the wireless communication device comprises multiple receiving modules and comprises at least two Subscriber Identity Modules (SIMs) the wireless communication device is configured to:
    determine a first cell and a first RAT to camp on for a first SIM based on estimating a performance of a number of RATs and cells in the wireless communication system;
    determine a second cell and a second RAT to camp on for a second SIM based on estimating a performance of the number of RATs and cells in the wireless communication system;
    determine whether idle mode tasks of the first and second SIMs with the determined cells and RATs overlap at least partly in time;
    when the idle mode tasks of the first and second SIMs do not overlap in time,
       handle the idle mode tasks of the first and second SIMs using a same one of the multiple receiving modules;
    when the idle mode tasks of the first and second SIMs overlap at least partly in time,
       enable one of the receiving modules to handle the idle mode tasks of one of the first and second SIMs and enabling a different one of the receiving modules to handle the idle mode tasks of a different one of the first and second SIMs.

12. The wireless communication device according to claim 11, wherein the performance of at least two different RATs are estimated for the respective SIMs.

13. The wireless communication device according to claim 11, wherein the performance of the number of RATs and cells are estimated based on at least one of or a combination of throughput, latency, mobility and power consumption.

14. The wireless communication device according to claim 13, wherein channel bandwidth is taken into account when estimating throughput or latency based on information of Multiple Input Multiple Output (MIMO) carrier aggregation, dual connectivity, modulation and coding or multi carrier capabilities of network nodes in the cells and/or the wireless communication device.

15. The wireless communication device according to claim 13, wherein carrier frequency is taken into account due to mobility when estimating throughput or latency.

16. The wireless communication device according to claim 13, wherein network loads of the cells are taken into account when estimating throughput or latency.

17. The wireless communication device according to claim 11, wherein the idle mode tasks comprises at least one of a synchronization procedure, a paging reception, a periodic monitoring of downlink assignments, signal strength measurements or reception of broadcast and multicast data.

18. The wireless communication device according to claim 11, comprising:
when the idle mode tasks of the first and second SIMs overlap at least partly in time, assigning a preferred one of the receiving modules to handle the idle mode tasks of a highest priority one of the first and second SIMs and assigning a different one of the receiving modules to handle the idle mode tasks of a different one of the first and second SIMs.

19. The wireless communication device according to claim 11, comprising:
when the idle mode tasks of the first and second SIMs overlap at least partly in time, assigning a preferred one of the receiving modules to handle the idle mode tasks of a higher throughput or a lower latency one of the first and second SIMs and assigning a different one of the receiving modules to handle the idle mode tasks of a different one of the first and second SIMs.

20. The wireless communication device according to claim 11, comprising:
when the idle mode tasks of the first and second SIMs overlap at least partly in time, deciding which of the receiving modules will handle the idle mode tasks of the first SIM and which other one of the receiving modules will handle the idle mode tasks of the second SIM based on a minimized total power consumption.

* * * * *

UNITED STATES PATENT AND TRADEMARK OFFICE
CERTIFICATE OF CORRECTION

PATENT NO. : 10,492,132 B2  
APPLICATION NO. : 15/025884  
DATED : November 26, 2019  
INVENTOR(S) : Lindoff et al.

Page 1 of 1

It is certified that error appears in the above-identified patent and that said Letters Patent is hereby corrected as shown below:

On the Title Page

Item (72), under "First Inventor", in Column 1, Line 1, delete "Bjarred (SE);" and insert -- Bjärred (SE); --, therefor.

Item (72), under "Third Inventor", in Column 1, Line 3, delete "Kavlinge (SE)" and insert -- Kävlinge (SE) --, therefor.

In the Drawings

In Fig. 2, Sheet 2 of 3, delete "Fig 2" and insert -- Fig. 2 --, therefor.

In the Specification

In Column 6, Line 60, delete "an heterogeneous" and insert -- a heterogeneous --, therefor.

In Column 7, Line 56, delete "(3 GPP)" and insert -- (3GPP) --, therefor.

In Column 12, Line 50, delete "consumption" and insert -- consumption. --, therefor.

In Column 12, Lines 50-64, delete "Those skilled in..........system-on-a-chip (SoC)." and insert the same at Line 51, as a new paragraph.

Signed and Sealed this  
Nineteenth Day of May, 2020

Andrei Iancu  
*Director of the United States Patent and Trademark Office*